UNITED STATES PATENT OFFICE.

CAMILLUS E. BIZZOZERO AND ERNEST BIZZOZERO, OF WEST QUINCY, MASSACHUSETTS.

BITTERS.

SPECIFICATION forming part of Letters Patent No. 392,776, dated November 13, 1888.

Application filed August 1, 1888. Serial No. 281,644. (No specimens.)

*To all whom it may concern:*

Be it known that we, CAMILLUS E. BIZZOZERO and ERNEST BIZZOZERO, of West Quincy, in the county of Norfolk and State of Massachusetts, have invented a new and useful Composition of Matter to be used as a medicine, of which the following is a specification.

Our composition consists of the following ingredients combined in the proportion stated, viz: Alcohol, five hundred grams; small centaury, (*Centaurium*,) twenty grams; green yarrow, (*Achillea millefolium*,) flower and leaf, twenty grams; angelica-root, fifteen grams; calamus-root, one gram; cinnamon-bark, (*Cinnamomum*,) one gram; myrrh, one gram; aloes, two grams; vanilla, twenty-five centigrams; cloves, fifty centigrams; nutmeg, fifteen centigrams; camphor, fifty centigrams. These ingredients are to be thoroughly mingled in a suitable bottle or vessel and left to stand for six days in the shade, air being excluded. The ingredients are to be thoroughly shaken once a day. After six days have expired the compound is ready for use. This medicine is a remedy for bowel troubles, neuralgia, headaches, malignant fever, &c., and is to be taken internally in doses of not more than a tablespoonful two hours apart.

What we claim, and desire to secure by Letters Patent of the United States, is—

The herein-described composition of matter, consisting of alcohol, centaury, yarrow, angelica, calamus, cinnamon, myrrh, aloes, vanilla, cloves, nutmeg, and camphor, combined in about the proportions specified.

CAMILLUS E. BIZZOZERO.
   ERNEST BIZZOZERO.

Witnesses:
 TOBIAS H. BURKE,
 THOS. F. BURKE.